(12) United States Patent
Asano (10) Patent No.: US 11,976,717 B2
(45) Date of Patent: May 7, 2024

(54) POWER TRANSMISSION DEVICE

(71) Applicant: ISUZU MOTORS LIMITED, Tokyo (JP)

(72) Inventor: Masaki Asano, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 641 days.

(21) Appl. No.: 17/272,249

(22) PCT Filed: Aug. 9, 2019

(86) PCT No.: PCT/JP2019/031623
§ 371 (c)(1),
(2) Date: Feb. 26, 2021

(87) PCT Pub. No.: WO2020/045056
PCT Pub. Date: Mar. 5, 2020

(65) Prior Publication Data
US 2021/0270360 A1    Sep. 2, 2021

(30) Foreign Application Priority Data
Aug. 31, 2018  (JP) .................................. 2018-163973

(51) Int. Cl.
*B60K 1/00* (2006.01)
*B60K 1/02* (2006.01)
(Continued)

(52) U.S. Cl.
CPC ........... *F16H 57/0408* (2013.01); *B60K 1/00* (2013.01); *B60K 1/02* (2013.01); *F16H 57/025* (2013.01);
(Continued)

(58) Field of Classification Search
CPC .. F16H 57/0408; F16H 57/025; F16H 57/027; F16H 57/031; F16H 57/037;
(Continued)

(56) References Cited

U.S. PATENT DOCUMENTS

| | | |
|---|---|---|
| 2006/0231339 A1 | 10/2006 | Enomoto et al. |
| 2016/0229293 A1 | 8/2016 | Seo et al. |
| 2018/0180164 A1 | 6/2018 | Hagino |

FOREIGN PATENT DOCUMENTS

| | | | |
|---|---|---|---|
| CN | 101128689 A | 2/2008 | |
| CN | 104044451 A * | 9/2017 | ............... B60K 1/00 |

(Continued)

OTHER PUBLICATIONS

Chinese National Intellectual Property Administration, Notification of the First Office Action, Application No. CN 201980056731.9, dated Apr. 29, 2023, in 13 pages.

(Continued)

*Primary Examiner* — Jacob D Knutson
(74) *Attorney, Agent, or Firm* — Procopio, Cory, Hargreaves & Savitch LLP (57) ABSTRACT

A transmission gear train includes at least a pair of gears, to which power is transmitted from drive force sources; gear cases in which lubricating oil is sealed and which accommodate the transmission gear train; and a plurality of drain holes provided in the gear cases and configured to discharge the lubricating oil from insides of the gear cases.

8 Claims, 5 Drawing Sheets

(51) Int. Cl.
*F16H 57/025* (2012.01)
*F16H 57/027* (2012.01)
*F16H 57/031* (2012.01)
*F16H 57/037* (2012.01)
*F16H 57/04* (2010.01)
*F16H 37/04* (2006.01)
*F16H 57/02* (2012.01)

(52) U.S. Cl.
CPC ......... *F16H 57/027* (2013.01); *F16H 57/031* (2013.01); *F16H 57/037* (2013.01); *B60K 2001/001* (2013.01); *F16H 37/041* (2013.01); *F16H 2057/02034* (2013.01); *F16H 2057/02052* (2013.01); *F16H 2702/02* (2013.01)

(58) Field of Classification Search
CPC ......... F16H 37/041; F16H 2057/02034; F16H 2057/02052; F16H 2702/02; B60K 1/00; B60K 1/02; B60K 2001/001
See application file for complete search history.

(56) References Cited

FOREIGN PATENT DOCUMENTS

| | | | | | |
|---|---|---|---|---|---|
| CN | 107166002 | A | | 9/2017 | |
| CN | 207388864 | U | | 5/2018 | |
| CN | 108237893 | A | | 7/2018 | |
| JP | 2002156028 | A | | 5/2002 | |
| JP | 2003227561 | A | * | 8/2003 | ........... B60K 17/105 |
| JP | 2014037855 | A | * | 2/2014 | |
| JP | 2014152811 | A | | 8/2014 | |
| JP | 2015061414 | A | | 3/2015 | |
| JP | 2015143559 | A | * | 8/2015 | |
| JP | 2015224696 | A | * | 12/2015 | |
| JP | 2015224696 | A | | 12/2015 | |
| WO | WO-2015145879 | A1 | * | 10/2015 | ........... F16H 57/027 |

OTHER PUBLICATIONS

International Search Report and Written Opinion for related PCT App No. PCT/JP2019/031623 dated Oct. 1, 2019, 7 pgs. (partial translation).

* cited by examiner

POWER TRANSMISSION DEVICE

CROSS-REFERENCE TO RELATED APPLICATIONS

This application is a U.S. National Stage entry of PCT Application No: PCT/JP2019/031623 filed Aug. 9, 2019, which claims priority to Japanese Patent Application No. 2018-163973 filed Aug. 31, 2018, the contents of which are incorporated herein by reference.

TECHNICAL FIELD

The present disclosure relates to a power transmission device, and particularly relates to a power transmission device including a gear case in which lubricating oil is sealed.

BACKGROUND ART

For example, Patent Literature 1 discloses a four-wheel drive hybrid vehicle including a front motor and an engine capable of transmitting power to front drive wheels, and a rear motor and an engine capable of transmitting power to rear drive wheels.

CITATION LIST

Patent Literature

Patent Literature 1: JP-A-2015-61414

SUMMARY OF INVENTION

Technical Problem

In general, a drive force source such as a motor or an engine is connected to left and right drive wheels via a power transmission device including a gear case in which a reduction gear or a differential gear is accommodated. When such a power transmission device is provided on each of a front side and a rear side of the vehicle, the power transmission device on the front side and the power transmission device on the rear side may need to be mounted in different postures depending on a space of the vehicle.

When mounting postures are different, positions at which drain holes and the like are provided are different between a gear case on the front side and a gear case on the rear side. For this reason, there is a problem that the respective gear cases have to be individually prepared for the front side and the rear side, leading to an increase in cost.

An object of the present disclosure is to provide a power transmission device capable of appropriately coping with a plurality of mounting postures while effectively reducing cost.

Solution to Problem

A power transmission device of the present disclosure includes: a transmission gear train including at least a pair of gears to which power is transmitted from a drive force source; a gear case sealing lubricating oil inside and accommodating the transmission gear train; and a plurality of drain holes provided in the gear case and allowing the lubricating oil to be discharged from an inside of the gear case, wherein at least one of the plurality of drain holes may be a first drain hole provided on one end side in a gear arrangement direction of the gear case.

The power transmission device may further include: a plurality of filler holes provided in the gear case and allowing the lubricating oil to be injected into the gear case.

The plurality of drain holes may further include a second drain hole provided on one end side in a direction orthogonal to the gear arrangement direction of the gear case.

In a case the gear case is mounted on a vehicle such that the gear arrangement direction is a vertical direction, the first drain hole may be positioned on a lower end side of the gear case, and in a case the gear case is mounted on the vehicle such that the gear arrangement direction is a horizontal direction, the second drain hole may be positioned on the lower end side of the gear case.

The power transmission device may further include: a cover member attached to the gear case, wherein the cover member may be provided with a mount boss for fixing the gear case and/or a breather device.

The power transmission device may further include: a differential mechanism accommodated in the gear case and configured to distribute power shifted by the transmission gear train to a left drive wheel and a right drive wheel.

The drive force source may be an electric motor mounted on the vehicle, and the transmission gear train may be a reduction gear train.

The gear case may include: a first gear case mounted on one side of the vehicle; and a second gear case provided on a second side opposite to the first side of the vehicle, wherein the power transmission device may be mounted on the vehicle such that the first gear case takes a first posture, and wherein the power transmission device may be mounted on the vehicle such that the second gear case takes a second posture.

The power transmission device may be mounted on the vehicle such that a longitudinal direction of the first gear case is an up-down direction of a vehicle body, and the power transmission device may be mounted on the vehicle such that a longitudinal direction of the second gear case is a front-rear direction of the vehicle body.

Advantageous Effects of Invention

According to a technology of the present disclosure, it is possible to provide a power transmission device capable of appropriately coping with a plurality of mounting postures while effectively reducing cost.

DESCRIPTION OF EMBODIMENTS

Hereinafter, a power transmission device according to the present embodiment will be described with reference to the accompanying drawings. The same components are denoted by the same reference signs, and names and functions of these components are also the same. Therefore, detailed descriptions of the same components are not repeated.

[Overall Configuration]

Figure 1:
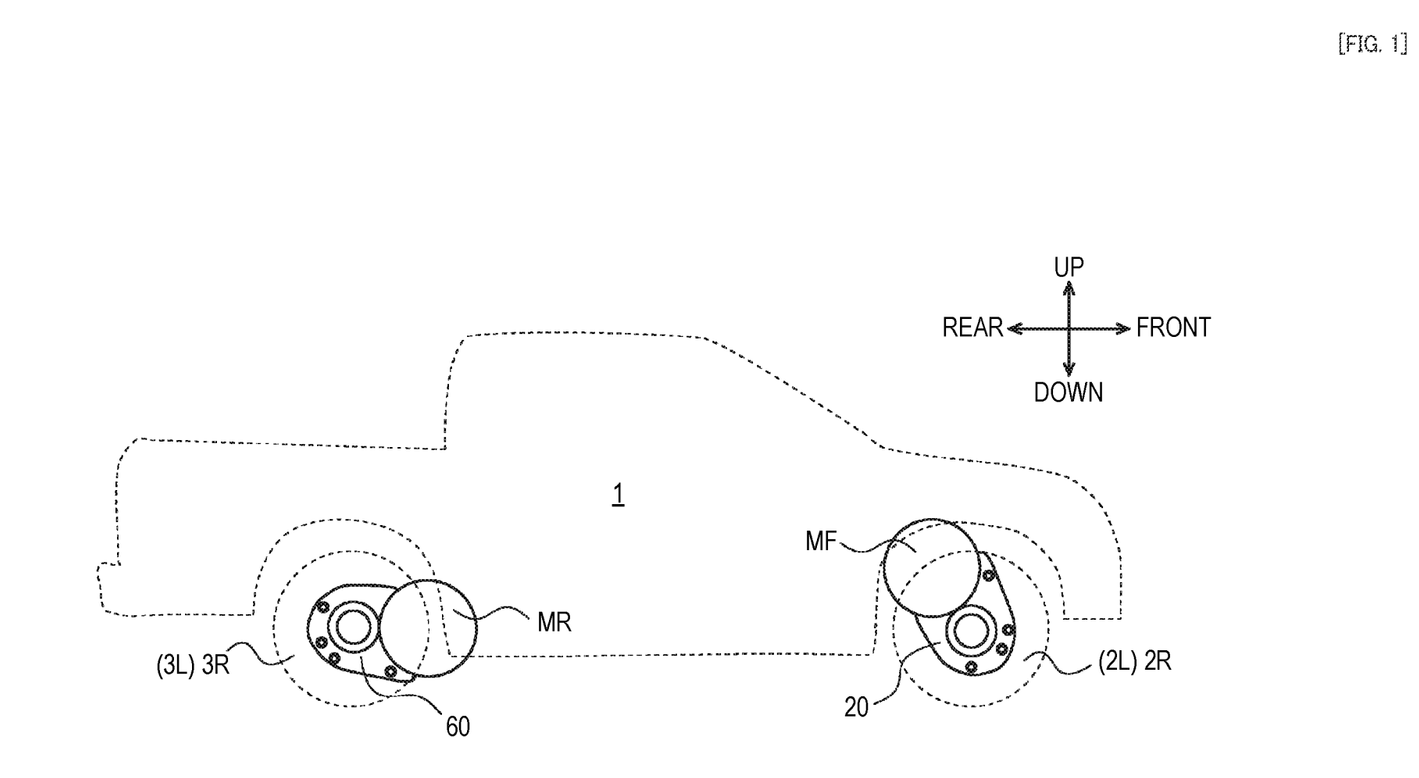
FIG. 1 is a schematic diagram showing a vehicle according to the present embodiment.

FIG. 1 is a schematic diagram showing a vehicle 1 according to the present embodiment. The vehicle 1 is, for example, a four-wheel drive pickup truck, a sport utility vehicle (SUV), or the like, and includes left and right front drive wheels 2L and 2R (the left front drive wheel 2L is not shown) and left and right rear drive wheels 3L and 3R (the left rear drive wheel 3L is not shown). In addition, a front motor MF and a rear motor MR are mounted on the vehicle 1 as an example of a drive force source. Further, a battery (not shown) that supplies electric power to the front motor MF and the rear motor MR is mounted on the vehicle 1.

The front motor MF is connected to the front drive wheels 2L and 2R via a front power transmission device 20. The front motor MF and the front power transmission device 20 are accommodated in an engine room on a front side of the vehicle 1.

The rear motor MR is connected to the rear drive wheels 3L and 3R via a rear power transmission device 60. The rear motor MR and the rear power transmission device 60 are accommodated under a loading platform on a rear side of the vehicle 1.

[Front Power Transmission Device]

Figure 2:
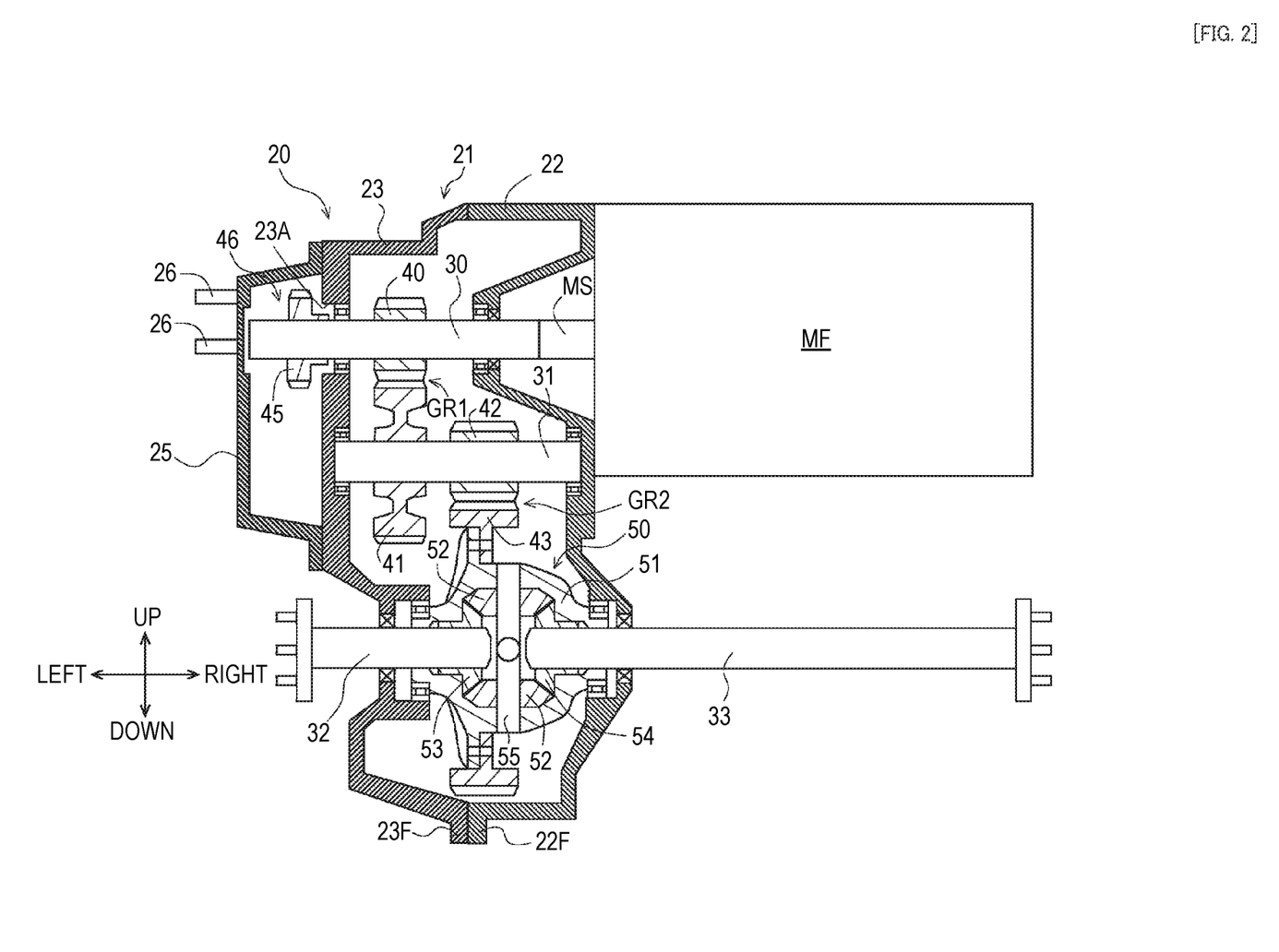
FIG. 2 is a schematic cross-sectional view showing a front power transmission device according to the present embodiment.

FIG. 2 is a schematic cross-sectional view showing the front power transmission device 20. The front power transmission device 20 includes a front gear case 21 (an example of a first gear case). The front gear case 21 includes a front right gear case 22 on a right side of a vehicle body and a front left gear case 23 on a left side of the vehicle body.

The front right gear case 22 is formed in a substantially bottomed cylindrical shape that opens to the left side of the vehicle body. The front left gear case 23 is formed in a substantially bottomed cylindrical shape that opens to the right side of the vehicle body. The left and right gear cases 22 and 23 are joined to each other by fastening flange portions 22F and 23F formed at an opening edge with bolts or the like (not shown).

In the front gear case 21, a front input shaft 30, a front counter shaft 31, a front left drive shaft 32, and a front right drive shaft 33 are provided in parallel to each other. The front left drive shaft 32 and the front right drive shaft 33 are disposed coaxially with each other, and are connected to the left and right front drive wheels 2L and 2R (see FIG. 1). The shafts 30 to 33 are rotatably supported by the front gear case 21 via bearings.

An output shaft MS of the front motor MF is connected to an input end of the front input shaft 30 by spline fitting or the like so as to be integrally rotatable. An input gear 40 is provided on the front input shaft 30 so as to be integrally rotatable.

A first counter gear 41 and a second counter gear 42 are provided on the front counter shaft 31 so as to be integrally rotatable. A front differential 50 (differential mechanism) is provided on sides of the drive shafts 32 and 33.

The first counter gear 41 constantly meshes with the input gear 40. The number of teeth of the first counter gear 41 is set to be larger than the number of teeth of the input gear 40, and a primary reduction gear train GR1 (transmission gear train) is formed by the gears 40 and 41. The second counter gear 42 constantly meshes with an output gear 43 provided on a front differential 50 side. The number of teeth of the output gear 43 is set to be larger than the number of teeth of the second counter gear 42, and a secondary reduction gear train GR2 (transmission gear train) is formed by the gears 42 and 43.

The front differential 50 includes a differential case 51, a plurality of (for example, four) differential pinion gears 52, and a pair of left and right side gears 53 and 54. The output gear 43 is fixed to the differential case 51 by a bolt or the like (not shown) so as to be integrally rotatable.

The differential pinion gear 52 is rotatably supported by a spider shaft 55 of the differential case 51. The differential pinion gear 52 constantly meshes with the left and right side gears 53 and 54. The front left drive shaft 32 is connected to the left side gear 53 by the spline fitting or the like so as to be integrally rotatable. The front right drive shaft 33 is connected to the right side gear 54 by the spline fitting or the like so as to be integrally rotatable.

The differential case 51, the differential pinion gear 52, the side gears 53 and 54, and the spider shaft 55 form a differential gear mechanism that transmits a drive force while allowing a rotation difference between the left and right drive shafts 32 and 33.

In the present embodiment, an insertion hole 23A through which a left side end of the front input shaft 30 is inserted is formed through the front left gear case 23. On a left side end portion of the front input shaft 30 protruding from the insertion hole 23A, a parking gear 45 forming a part of a parking device 46 is provided so as to be integrally rotatable.

The parking device 46 includes a parking pole, a cam, and the like, which are not shown, and is configured to be selectively switched between a locked state in which the cam presses the parking pole to engage with the parking gear 45 and a released state in which the parking pole is separated from the parking gear 45 to release the engagement in response to an operation of an operation lever. The parking device 46 is accommodated in a parking cover member 25 of a substantially bottomed cylindrical shape fixed to a left side surface of the front left gear case 23.

A plurality of mount bosses 26 for fixing the front power transmission device 20 to the vehicle body protrude from a left side surface of the parking cover member 25. On the left side surface of the parking cover member 25, a breather device (not shown) is provided to prevent air inside the front gear case 21 from becoming excessively high temperature and high pressure.

[Rear Power Transmission Device]

Figure 3:
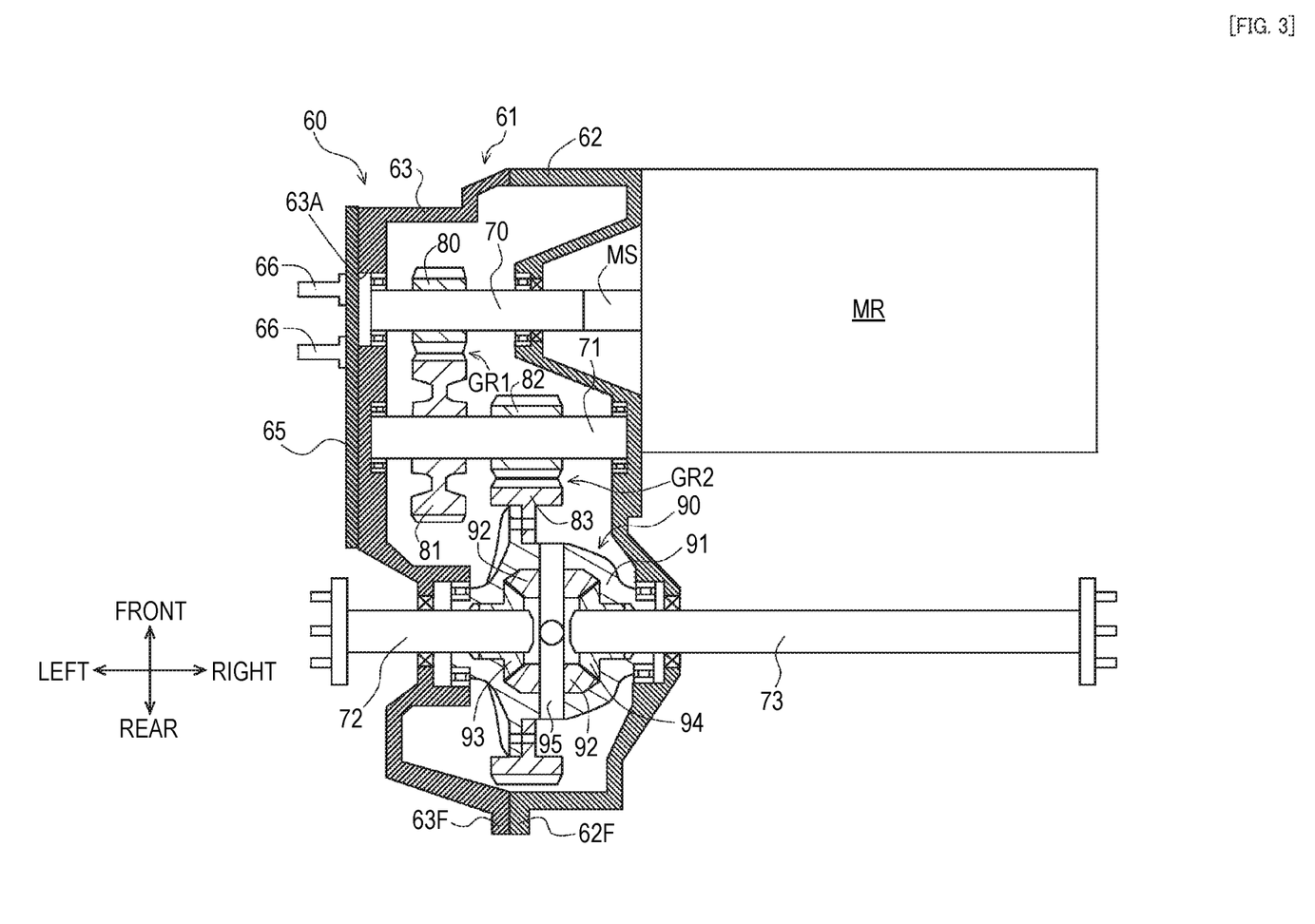
FIG. 3 is a schematic cross-sectional view showing a rear power transmission device according to the present embodiment.

FIG. 3 is a schematic cross-sectional view showing the rear power transmission device 60. As shown in the figure, the rear power transmission device 60 includes a rear gear case 61 (an example of a second gear case). The rear gear case 61 includes a rear right gear case 62 on the right side of the vehicle body and a rear left gear case 63 on the left side of the vehicle body.

The rear right gear case 62 is formed in the same shape as the front right gear case 22 above (see FIG. 2). Specifically, the rear right gear case 62 is formed in a substantially bottomed cylindrical shape that opens to the left side of the vehicle body. The rear left gear case 63 is formed in the same shape as the front left gear case 23 above (see FIG. 2). Specifically, the rear left gear case 63 is formed in a substantially bottomed cylindrical shape that opens to the right side of the vehicle body. The left and right gear cases 62 and 63 are joined to each other by fastening flange portions 62F and 63F formed at an opening edge with bolts or the like (not shown).

In the rear gear case 61, a rear input shaft 70, a rear counter shall 71, a rear left drive shaft 72, and a rear right drive shaft 73 are provided in parallel to each other. The rear left drive shaft 72 and the rear right drive shaft 73 are disposed coaxially with each other, and are connected to the left and right rear drive wheels 3L and 3R (see FIG. 1). The shafts 70 to 73 are rotatably supported by the rear gear case 61 via bearings.

An output shaft MS of the rear motor MR is connected to an input end of the rear input shaft 70 by the spline fitting or the like so as to be integrally rotatable. An input gear 80 is provided on the rear input shaft 70 so as to be integrally rotatable. The input gear 80 is preferably formed in the same shape as the input gear 40 above (see FIG. 2).

A first counter gear 81 and a second counter gear 82 are provided on the rear counter shaft 71 so as to be integrally rotatable. The first counter gear 81 is preferably formed in the same shape as the first counter gear 41 above (see FIG. 2), and the second counter gear 82 is preferably formed in the same shape as the second counter gear 42 (see FIG. 2). A rear differential 90 (differential mechanism) is provided on sides of the drive shafts 72 and 73.

The first counter gear 81 constantly meshes with the input gear 80. The number of teeth of the first counter gear 81 is set to be larger than the number of teeth of the input gear 80, and a primary reduction gear train GR1 (transmission gear train) is formed by the gears 80 and 81. The second counter gear 82 constantly meshes with an output gear 83 provided on a rear differential 90 side. The number of teeth of the output gear 83 is set to be larger than the number of teeth of the second counter gear 82, and a secondary reduction gear train GR2 (transmission gear train) is formed by the gears 82 and 83.

The rear differential 90 includes a differential case 91, a plurality of (for example, four) differential pinion gears 92, and a pair of left and right side gears 93 and 94. The output gear 83 is fixed to the differential case 91 by a bolt or the like (not shown) so as to be integrally rotatable. The rear differential 90 preferably has the same structure as the front differential 50 (see FIG. 2) above.

The differential pinion gear 92 is rotatably supported by a spider shaft 95 of the differential case 91. The differential pinion gear 92 constantly meshes with the left and right side gears 93 and 94. The rear left drive shaft 72 is connected to the left side gear 93 by the spline fitting or the like so as to be integrally rotatable. The rear right drive shaft 73 is connected to the right side gear 94 by the spline fitting or the like so as to be integrally rotatable.

The differential case 91, the differential pinion gear 92, the side gears 93 and 94, and the spider shaft 95 form a differential gear mechanism that transmits a drive force while allowing a rotation difference between the left and right drive shafts 72 and 73.

In the present embodiment, an insertion hole 63A is formed through the rear left gear case 63 coaxially with the rear input shaft 70. A cover member 65 that closes the insertion hole 63A is fixed to a left side surface of the rear left gear case 63 with a bolt or the like (not shown). A plurality of mount bosses 66 for fixing the rear power transmission device 60 to the vehicle body protrude from a left side surface of the cover member 65. On the left side surface of the cover member 65, a breather device (not shown) is provided to prevent air inside the rear gear case 61 from becoming excessively high temperature and high pressure.

[Mounting State of Front Power Transmission Device]

Figure 4A:
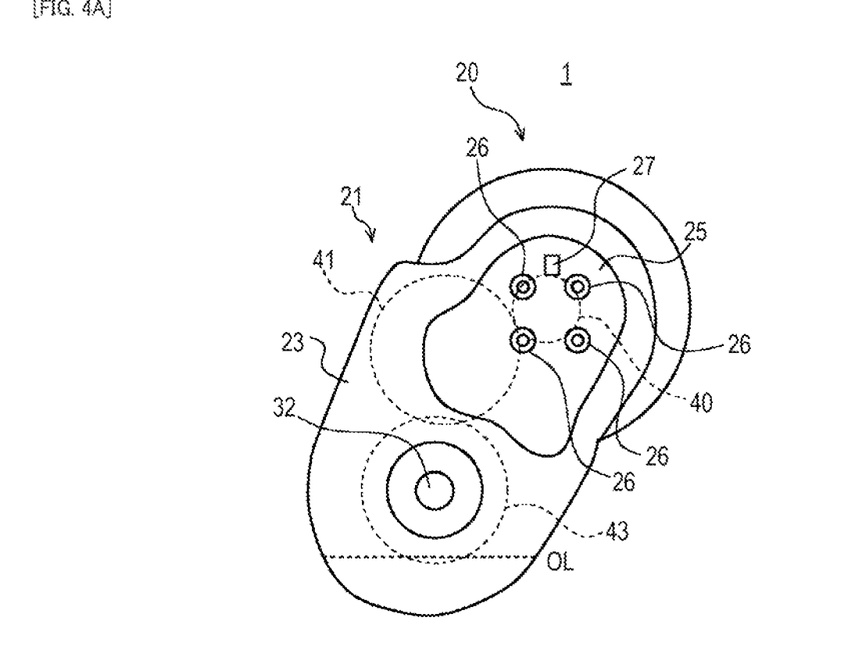
FIG. 4A is a schematic diagram showing the front power transmission device according to the present embodiment, and is a side view as viewed from a left side of a vehicle body.
Figure 4B:
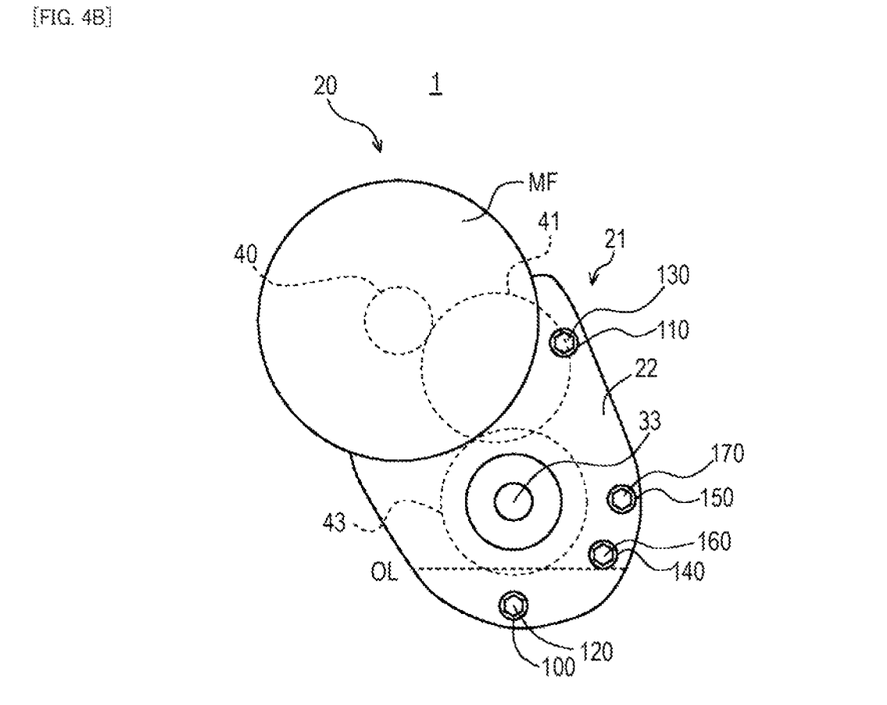
FIG. 4B is a schematic diagram showing the front power transmission device according to the present embodiment, and is a side view as viewed from a right side of the vehicle body.

FIGS. 4A and 4B are schematic diagrams showing a state in which the front power transmission device 20 is mounted on a vehicle, in which FIG. 4A is a side view as viewed from the left side of the vehicle body, and FIG. 4B is a side view as viewed from the right side of the vehicle body.

As shown in FIGS. 4A and 4B, the front power transmission device 20 is mounted on the vehicle 1 such that a longitudinal direction (arrangement direction of the gears 40 to 43) of the front gear case 21 is an up-down direction (vertical direction) of the vehicle body (an example of a first posture), more specifically, such that the input gear 40 is positioned on an upper side and the output gear 43 is positioned on a lower side. In the figure, a broken line OL schematically indicates a liquid surface level of lubricating oil sealed in the front gear case 21. The lubricating oil is sealed such that at least a lower end side of the output gear 43 is immersed in the lubricating oil.

As shown in FIG. 4A, the parking cover member 25 is fixed to the left side surface of the front left gear case 23. A plurality of (a total of four in a shown example) mount bosses 26 for fixing the front power transmission device 20 to the vehicle body protrude from the left side surface of the parking cover member 25. A breather device 27 is provided on an upper end side of the left side surface of the parking cover member 25.

As shown in FIG. 4B, a first front drain hole 100 for discharging the lubricating oil from an inside of the front gear case 21 is formed through the front right gear case 22. A second front drain hole 110 that functions as a drain hole for discharging the lubricating oil from the inside of the front gear case 21 when the front power transmission device 20 is mounted in a posture different from that in a shown example is formed through the front right gear case 22. Each of the front drain holes 100 and 110 has a female screw, and is sealed by screwing drain bolts 120 and 130 into which a seal washer (not shown) is fitted.

A first front filler hole 140 for injecting the lubricating oil into the front gear case 21 is formed through the front right gear case 22. Further, a second front filler hole 150 that functions as a filler hole for injecting the lubricating oil into the front gear case 21 when the front power transmission device 20 is mounted in a posture different from that in the shown example is formed through the front right gear case 22. Each of the filler holes 140 and 150 has a female screw, and is sealed by screwing tiller bolts 160 and 170 into which a seal washer (not shown) is fitted.

The first front drain hole 100 is formed through an end portion on an output gear 43 side of an end portion in a longitudinal direction (arrangement direction of the gears 40 to 43) of the front right gear case 22. The second front drain hole 110 is formed through an end portion positioned substantially in a middle between the input gear 40 and the output gear 43 of an end portion in a lateral direction (direction orthogonal to the arrangement direction of the gears 40 to 43) of the front right gear case 22.

That is, when the front power transmission device 20 is mounted on the vehicle 1 such that the input gear 40 is on the upper side and the output gear 43 is on the lower side, the first front drain hole 100 is disposed on a lower end side of the front right gear case 22 (below the liquid surface level OL of the lubricating oil), and the second front drain hole 110 is disposed at a substantially middle position in an up-down direction of the front right gear case 22 (above the liquid surface level OL of the lubricating oil).

The first front filler hole 140 and the second front filler hole 150 are formed through a peripheral edge portion of the front right gear case 22 adjacent to the output gear 43. When the front power transmission device 20 is mounted on the vehicle 1 such that the input gear 40 is on the upper side and the output gear 43 is on the lower side, the front filler holes 140 and 150 are positioned above the liquid surface level OL of the lubricating oil.

[Mounting State of Rear Power Transmission Device]

Figure 5A:
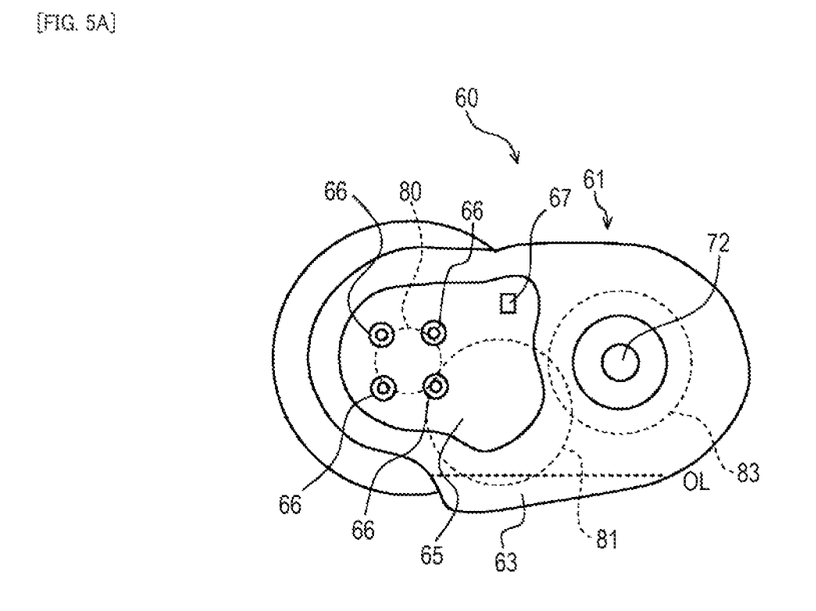
FIG. 5A is a schematic diagram showing the rear power transmission device according to the present embodiment, and is a side view as viewed from the left side of the vehicle body.
Figure 5B:
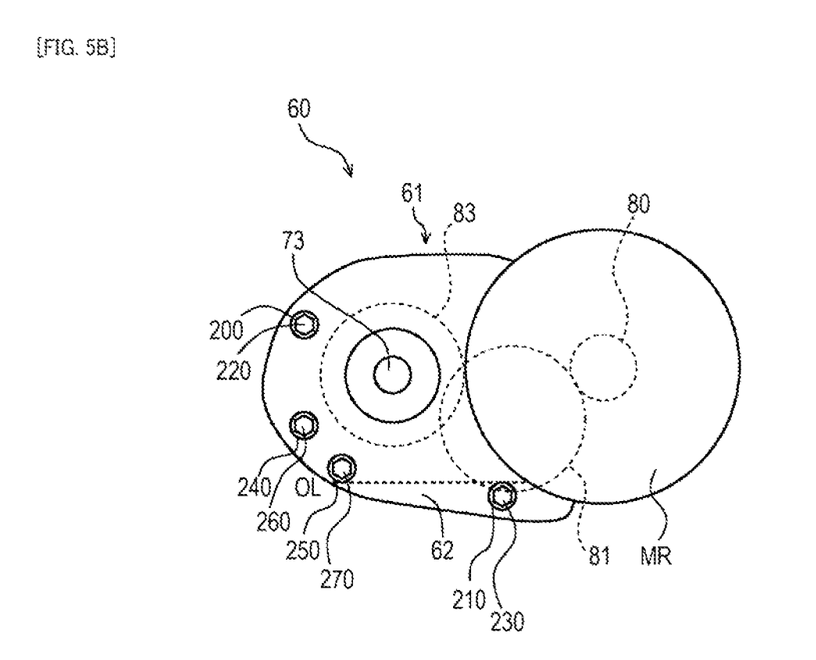
FIG. 5B is a schematic diagram showing the rear power transmission device according to the present embodiment, and is a side view as viewed from the right side of the vehicle body.

FIGS. 5A and 5B are schematic diagrams showing a state in which the rear power transmission device 60 is mounted on the vehicle, in which FIG. 5A is a side view as viewed from the left side of the vehicle body, and FIG. 5B is a side view as viewed from the right side of the vehicle body.

As shown in FIGS. 5A and 5B, the rear power transmission device 60 is mounted on the vehicle 1 such that a longitudinal direction (arrangement direction of the gears 80 to 83) of the rear gear case 61 is a front-rear direction (horizontal direction) of the vehicle body (an example of a second posture), more specifically, such that the input gear 80 is positioned on the front side and the output gear 83 is positioned on the rear side. In the figure, the broken line OL schematically indicates a liquid surface level of the lubricating oil sealed in the rear gear case 61. The lubricating oil is sealed such that at least a lower end side of the first counter gear 81 is immersed in the lubricating oil.

As shown in FIG. 5A, the cover member 65 is fixed to the left side surface of the rear left gear case 63. A plurality of (a total of four in a shown example) mount bosses 66 for fixing the rear power transmission device 60 to the vehicle body protrude from the left side surface of the cover member 65. A breather device 67 is provided on an upper end side of the left side surface of the cover member 65.

As shown in FIG. 5B, a second rear drain hole 210 for discharging the lubricating oil from an inside of the rear gear case 61 is formed through the rear right gear case 62. A first rear drain hole 200 that functions as a drain hole for discharging the lubricating oil from the inside of the rear gear case 61 when the rear power transmission device 60 is mounted in a posture different from that in a shown example is formed through the rear right gear case 62. Each of the rear drain holes 200 and 210 has a female screw, and is sealed by screwing drain bolts 220 and 230 into which a seal washer (not shown) is fitted.

A second rear filler hole 250 for injecting the lubricating oil into the rear gear case 61 is formed through the rear right gear case 62. Further, a first rear filler hole 240 that functions as a filler hole for injecting the lubricating oil into the rear gear case 61 when the rear power transmission device 60 is mounted in a posture different from that in the shown example is formed through the rear right gear case 62. Each of the rear filler holes 240 and 250 has a female screw, and is sealed by screwing filler bolts 260 and 270 into which a seal washer (not shown) is fitted.

The second rear drain hole 210 is formed through an end portion positioned substantially in a middle between the input gear 80 and the output gear 83 of an end portion in a lateral direction (direction orthogonal to the arrangement direction of the gears 80 to 83) of the rear right gear case 62. The first rear drain hole 200 is formed through an end portion on an output gear 83 side of an end portion in a longitudinal direction (arrangement direction of the gears 80 to 83) of the rear right gear case 62.

That is, when the rear power transmission device 60 is mounted on the vehicle 1 such that the input gear 80 is on the front side and the output gear 83 is on the rear side, the second rear drain hole 210 is disposed on a lower end side of the rear right gear case 62 (below the liquid surface level OL of the lubricating oil), and the first rear drain hole 200 is disposed at a substantially middle position in an up-down direction of the rear right gear case 62 (above the liquid surface level OL of the lubricating oil).

The first rear filler hole 240 and the second rear filler hole 250 are formed through a peripheral edge portion of the rear right gear case 62 adjacent to the output gear 83. When the rear power transmission device 60 is mounted on the vehicle such that the input gear 80 is on the front side and the output gear 83 is on the rear side, the rear filler holes 240 and 250 are positioned above the liquid surface level OL of the lubricating oil.

According to the present embodiment described above in detail, the front right gear case 22 shown in FIG. 4B is formed in the same shape as the rear right gear case 62 shown in FIG. 5B. The front left gear case 23 shown in FIG. 4A is formed in the same shape as the rear left gear case 63 shown in FIG. 5A. Further, the first drain holes 100, 200 are provided on the end portions of the output gears 43, 83 sides (an example of one end side of a gear arrangement direction of the gear case) of the end portions in gear arrangement directions of the right gear cases 22, 62, and the second drain holes 110, 210 are provided at the end portions positioned substantially in middles between the input gears 40, 80 and the output gears 43, 83 (an example of one end side in a direction orthogonal to the gear arrangement direction of the gear case) of the end portions in directions orthogonal to the gear arrangement directions of the right gear cases 22, 62.

That is, when the front power transmission device 20 is mounted on the vehicle 1 such that the gear arrangement direction is the vertical direction and the output gear 43 is below the input gear 40, the first drain hole 100 is disposed on the lower end side of the front right gear case 22 (below the liquid surface level OL of the lubricating oil), and when the rear power transmission device 60 is mounted on the vehicle 1 such that the gear arrangement direction is the horizontal direction, the second drain hole 210 is disposed on the lower end side of the rear right gear case 62 (below the liquid surface level OL of the lubricating oil).

Accordingly, it is possible to mount the power transmission devices 20, 60 while appropriately changing the postures in accordance with a space of the vehicle 1, and it is possible to achieve commonality between the front gear case 21 and the rear gear case 61. In addition, the commonality of the gear cases 21, 61 makes it possible to effectively reduce cost of the entire device.

In addition, since the cover members 25, 65 provided with the mount bosses 26, 66 and the breather devices 27, 67 are independent of the gear cases 21, 61, if only the cover members 25, 65 are changed, it is possible to appropriately select mounting postures of the power transmission devices 20, 60 without changing the gear cases 21, 61, and it is possible to effectively reduce manufacturing cost.

In addition, since the front power transmission device 20 is individually provided in the front motor MF and the rear power transmission device 60 is individually provided in the rear motor MR, and power transmission systems on the front side and the rear side are independently configured, a propeller shaft or the like for transmitting power from the front side to the rear side is not necessary, and it is possible to effectively secure a mounting space for a battery for supplying electric power to each of the motors MF and MR and other devices.

The present disclosure is not limited to the above described embodiment and can be appropriately modified and implemented without departing from the spirit of the present disclosure.

For example, although the drain holes 100, 110, 200, and 210 and the filler holes 140, 150, 240, and 250 are provided in the right gear cases 22, 62 in the above embodiment, the drain holes and the filler holes may be provided in the left gear cases 23, 63.

Although the parking cover member 25 is described as being attached to the front gear case 21 and the cover member 65 is described as being attached to the rear gear case 61, the parking cover member 25 and the cover member 65 may be replaced with each other.

The vehicle 1 is not limited to an electric automatic vehicle including the electric motors MF and MR as the drive force source, and may be a hybrid vehicle using an engine or an engine and the electric motors MF and MR as the drive force source.

In addition, the vehicle 1 is not limited to the pickup truck or the SUV, and can be widely applied to other vehicles such as a passenger vehicle or a cab-over-type vehicle.

The present application is based on Japanese Patent Application (No. 2018-163973) filed on Aug. 31, 2018, contents of which are incorporated herein as reference.

INDUSTRIAL APPLICABILITY

The present invention has an effect of being able to provide the power transmission device capable of appropriately coping with a plurality of mounting postures while effectively reducing cost, and is useful for the power transmission device or the like.

REFERENCE SIGNS LIST

1 Vehicle
2L, 2R Front drive wheel
3L, 3R Rear drive wheel
MF Front motor (drive force source)
MR Rear motor (drive force source)
20 Front power transmission device
21 Front gear case
22 Front right gear case
23 Front left gear case
25 Parking cover member (cover member)
26 Mount boss
27 Breather device
40 Input gear
41 First counter gear
42 Second counter gear
43 Output gear
50 Front differential (differential mechanism)
60 Rear power transmission device
61 Rear gear case
62 Rear right gear case
63 Rear left gear case
65 Cover member
66 Mount boss
67 Breather device
80 Input gear
81 First counter gear
82 Second counter gear
83 Output gear
90 Rear differential (differential mechanism)
100 First front drain hole
110 Second front drain hole
140 First front filler hole
150 Second front filler hole
200 First rear drain hole
210 Second rear drain hole
240 First rear filler hole
250 Second rear filler hole

The invention claimed is:

1. A power transmission device comprising:
   a transmission gear train comprising at least a pair of gears to which power is transmitted from a drive force source;
   a gear case sealing lubricating oil inside and accommodating the transmission gear train;
   a plurality of drain holes provided in the gear case and allowing the lubricating oil to be discharged from an inside of the gear case,
      wherein at least one of the plurality of drain holes is a first drain hole provided on one end side in a gear arrangement direction of the gear case; and
   a cover member attached to the gear case,
   wherein the cover member is provided with a mount boss for fixing the gear case and/or a breather device.

2. The power transmission device according to claim 1, further comprising:
   a plurality of filler holes provided in the gear case and allowing the lubricating oil to be injected into the gear case.

3. The power transmission device according to claim 1, wherein the plurality of drain holes further includes a second drain hole provided on one end side in a direction orthogonal to the gear arrangement direction of the gear case.

4. The power transmission device according to claim 3, wherein in a case the gear case is mounted on a vehicle such that the gear arrangement direction is a vertical direction, the first drain hole is positioned on a lower end side of the gear case, and
   wherein in a case the gear case is mounted on the vehicle such that the gear arrangement direction is a horizontal direction, the second drain hole is positioned on the lower end side of the gear case.

5. The power transmission device according to claim 1, further comprising:
   a differential mechanism accommodated in the gear case and configured to distribute power shifted by the transmission gear train to a left drive wheel and a right drive wheel.

6. The power transmission device according to claim 1, wherein the drive force source is an electric motor mounted on a vehicle, and the transmission gear train is a reduction gear train.

7. The power transmission device according to claim 1, wherein the gear case comprises:
   a first gear case mounted on a one side of a vehicle; and
   a second gear case provided on a second side opposite to the first side of the vehicle,
   wherein the power transmission device is mounted on the vehicle such that the first gear case takes a first posture, and
   wherein the power transmission device is mounted on the vehicle such that the second gear case takes a second posture.

8. The power transmission device according to claim 7, wherein the power transmission device is mounted on the vehicle such that a longitudinal direction of the first gear case is an up-down direction of a vehicle body, and wherein the power transmission device is mounted on the vehicle such that a longitudinal direction of the second gear case is a front-rear direction of the vehicle body.

* * * * *